(12) United States Patent
Sandmeier

(10) Patent No.: US 8,240,971 B2
(45) Date of Patent: Aug. 14, 2012

(54) HANDLING MANIPULATOR ASSEMBLY

(75) Inventor: Bruno Sandmeier, Seengen (CH)

(73) Assignee: Erowa AG, Reinach (CH)

( * ) Notice: Subject to any disclaimer, the term of this patent is extended or adjusted under 35 U.S.C. 154(b) by 283 days.

(21) Appl. No.: 12/061,087

(22) Filed: Apr. 2, 2008

(65) Prior Publication Data

US 2008/0253876 A1 Oct. 16, 2008

(30) Foreign Application Priority Data

Apr. 10, 2007 (CH) ...................................... 0587/07

(51) Int. Cl.
*B25J 18/00* (2006.01)

(52) U.S. Cl. ............... 414/744.5; 414/744.3; 74/490.06; 901/17; 901/29

(58) Field of Classification Search ............... 414/744.3, 414/744.5, 754, 776, 783; 74/490.06; 901/17.29
See application file for complete search history.

(56) References Cited

U.S. PATENT DOCUMENTS

| 3,575,301 A * | 4/1971 | Panissidi ..................... 414/618 |
| 4,507,046 A * | 3/1985 | Sugimoto et al. ............. 414/735 |
| 5,667,353 A * | 9/1997 | Drake ......................... 414/744.3 |
| 2005/0196263 A1* | 9/2005 | Tamura ....................... 414/744.5 |

FOREIGN PATENT DOCUMENTS

| JP | 2005076965 | | 3/1993 |
| JP | 2001-274218 | * | 5/2001 |
| JP | 2001158507 | | 6/2001 |
| JP | 2004090186 | | 3/2004 |

* cited by examiner

*Primary Examiner* — Donald Underwood
(74) *Attorney, Agent, or Firm* — Maginot, Moore & Beck, LLP

(57) ABSTRACT

A handling manipulator assembly comprises a vertical extending main support (2) arranged on a rotary plate (3). Arranged on the main support (2) is a vertically travelling vertical carriage (9) to which a horizontal extension arm (12) is secured. Mounted on the horizontal extension arm (12) is an articulated arm (14) provided at the end with a manipulator gripper (18). Such a handling manipulator assembly (1) is suitable to advantage to feed/remove tools or workpieces to/from a machine tool provided with a front portal.

19 Claims, 4 Drawing Sheets

HANDLING MANIPULATOR ASSEMBLY

BACKGROUND

The invention relates to a handling manipulator assembly and uses therefore, as well as to a related machine tool assembly.

For automating workpiece feeding and removal to/from a machine tool such as a lathe, a milling machine, a die sinker, a die cutter, handling assemblies such as, for example, robotic manipulators, are known. These handling assemblies can, of course, be employed for feeding/removing workpieces as well as for feeding/removing tools.

Known from EP-A-1 481 759 is a generic handling manipulator assembly. This assembly features a horizontal portal on which a first carriage can travel horizontally. The first carriage is provided with an elongated support on which a further carriage can travel vertically. Mounted on the first carriage is an arm designed to pivot about a horizontal axis. Fitted to the end of the arm is a workpiece manipulating gripper. This handling manipulator assembly is particularly suitable for deep insertion into a side opening of a machine tool.

Disclosed in JP-A-2004 090186 is a generic handling manipulator assembly in the form of a transfer robotic attachment. This features a vertically extending main support (plate) rotatable about a vertical axis supporting a horizontal extension arm designed for vertical travel which in a first example (variants 200A to 200C) comprises two plate-type supports arranged axially in line, one above the other. The first support is fixedly connected to two brackets arranged on the main support whilst the second support is provided with a horizontal rotatable forked part. In a second embodiment (variants 200D and 200E) the horizontal extension arm is provided with two vertically rotatable pivot arms, the forked part being rotatable either horizontally or vertically. Whilst the forked part on the first variant is only conditionally movable, the second variant with its two pivot arms is relatively complicated, on the one hand, it on the other being capable of handling only small loads. On top of this, in both embodiments the robotic manipulator is restricted in its flexibility by its range of motion, namely the horizontal travel of the manipulating gripper being limited.

Known in conclusion from JP-A-05076965 is a rail-mounted robotic manipulator designed to travel between two presses spaced away from each other horizontally for transferring workpieces directly from one press to the other. This robotic manipulator is designed so that its manipulator arm can be rotated about a vertically axis whilst the robotic manipulator is travelled horizontally.

SUMMARY

The invention has the object of sophisticating a handling manipulator assembly such that it finds universal application in being suitable to particular advantage for feeding/removing workpieces or tools to/from a machine tool without substantially obstructing access to the machine tool whilst in addition being constructed relatively simple and rugged.

In one embodiment, the handling manipulator assembly is provided with its two axes of rotation as well as vertical and horizontal linear axes, which excels by its high flexibility and simple, rugged construction. The handling manipulator assembly is capable of accessing any point within a virtual cylindrical space except for a middle portion. Linear guide of the horizontal extension arm for horizontal travel additionally achieves a large horizontal travel of the horizontal extension arm and thus, of course, of the manipulating gripper at the expense of comparatively little energy and with high precision.

When the main support, as defined in a preferred example aspect, is arranged on a main carriage for horizontal travel, the flexibility of the handling manipulator assembly is enhanced by its range of motion being increased. In a further preferred aspect, the manipulating gripper is supported by means of a jointing link at the articulated arm, the axis of rotation of the jointing link making an angle between 30° and 60°, preferably 45° to the vertical. This now makes it possible to pick and transfer the workpieces or tools not only horizontally but also at an angle.

A further object of the invention is to define a machine tool assembly comprising at least one machine tool and a handling manipulator assembly so that unobstructed access to the machine tool via its front portal is now possible.

DESCRIPTION OF THE FIGURES

The invention will now be detailed by way of a preferred example aspect of the invention with reference to the drawings in which.

DESCRIPTION OF THE ILLUSTRATED EMBODIMENTS

Figure 1:
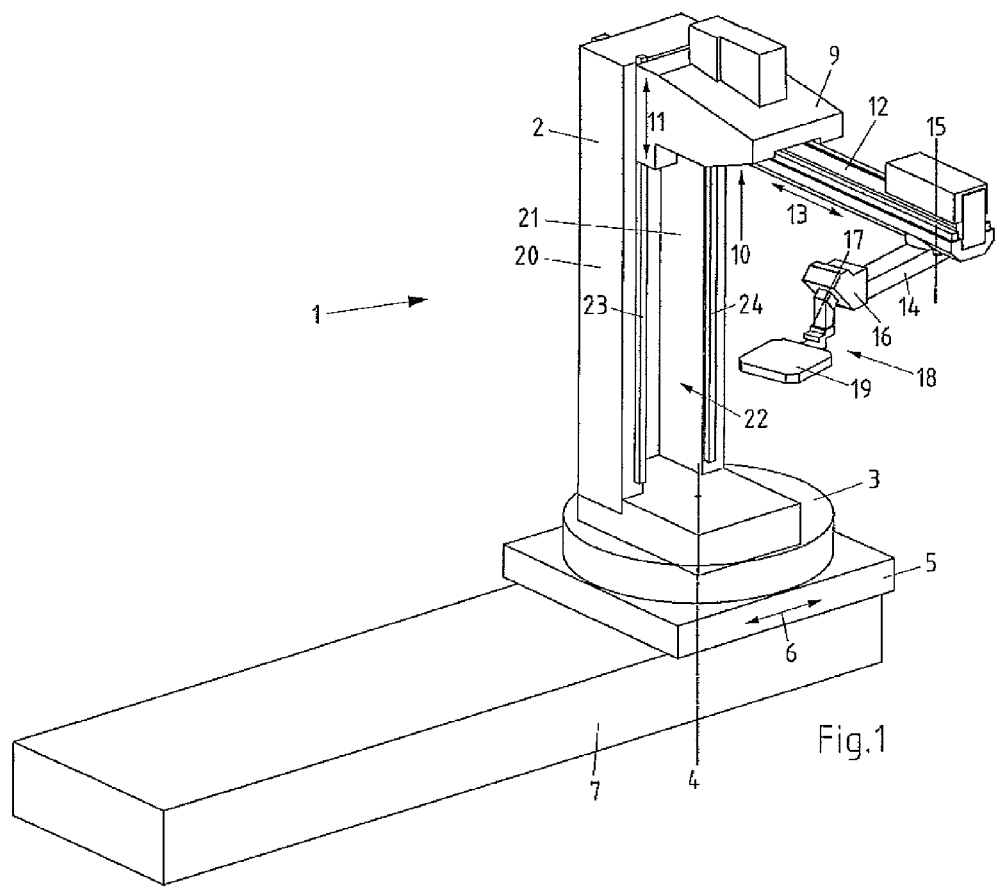
FIG. 1 is a diagrammatic illustration of a handling manipulator assembly in a first view.

Referring now to FIG. 1 there is illustrated a handling manipulator assembly in accordance with one embodiment of the invention for explaining its basic configuration. The handling manipulator assembly 1 comprises a vertical main support 2 arranged on a rotary plate 3. In the present example the main support 2 is arranged centered on the rotary plate 3, it is, however, just as possible to arrange it off-centered. The rotary plate 3 rotating about a vertical axis 4 is fixed to a horizontally travelled main carriage 5 which, as indicated by the double arrow 6, can be travelled along a runner 7. Arranged on the vertical main support 2 is a vertical carriage 9 designed for vertical travel. Here again, the direction of travel of the vertical carriage 9 is indicated by a double arrow 11. The vertical carriage 9 comprises a rugged supporting body at the underside 10 of which a horizontal extension arm 12 designed for horizontal travel is arranged, the direction of travel of which is likewise indicated by a double arrow 13. The horizontal extension arm 12 is mounted on the vertical carriage 9 by means of a linear slide guide, preferably in the form of a linear guide mount, a dovetail guide or rail guide. It is this linear slide guide that achieves a large horizontal travel of the horizontal extension arm 12 at the expense of comparatively little energy whilst enabling precise repetitive access to any horizontal position as defined.

Arranged at the front end of the horizontal extension arm 12 is an articulated arm 14 rotatable about a vertical axis 15. Secured to the end of the articulated arm 14 by means of a jointing link 16 is a manipulator gripper 18, by means of which parts such as for example tools and/or workpieces and/or pallets can be picked and fed, where necessary, to a machine tool and also removed therefrom. The jointing link 16 has an axis of rotation 17 about which the manipulator gripper 18 is rotatable. Shown diagrammatically in the present example is a plate 19 which is picked by the manipulator gripper 18 and symbolizing a pallet for mounting a workpiece. Not shown here is how, normally, the workpiece to be machined is fixed to the workpiece pallet 19. It is understood that the manipulator gripper 18 may take a variety of forms by it being provided, for example, with moving manipulator fingers, clamping elements, manipulating elements for positive and/or non-positive connection, etc, all of which are not detailed. It is, of course, just as possible that the manipulator gripper 18 may directly access non-palletized workpieces. The axis of rotation 17 of the jointing link 16 makes an angle of preferably approximately 45° to the vertical.

The length of the articulated arm 14 preferably corresponds to at least 0.4 times that of the horizontal extension arm 12, the ratio of articulated arm 14 to horizontal extension arm 12 usually being between 0.4:1 and 1:1. In other words, the length of articulated arm 14 being preferably between 40% and 100% to the length of horizontal extension arm 12. Thus, when the horizontal extension arm 12 is approximately 2 meters long, the articulated arm 14 has a length of between 0.8 and 2 meters. The length of the articulated arm 14 is particularly of decisive importance when the handling manipulator assembly 1 is arranged on the side of the machine tool, in which case, the length of the articulated arm 14 dictates how far the handling manipulator assembly 1 can insert its manipulator gripper 18 through a front portal into the machine tool.

When the articulated arm 14 is significantly shorter than the horizontal extension arm 12, the latter can be horizontal travelled by roughly the difference between the horizontal extension arm 12 and articulated arm 14 with full freedom of movement of the articulated arm 14. On the other hand, the radial freedom of movement of the manipulator gripper 18 is dictated by the absolute length of the horizontal extension arm 12 and also by that of the articulated arm 14.

The vertical main support 2 is provided with two side supporting profiles 20, 21 defining between them a central slot 22. The horizontal extension arm 12 can extend into this slot 22 so that it can be travelled by its rear end backwards through this slot 22 to thus permit a large travel of the horizontal extension arm 12. Secured to the face of each supporting profile 20, 21 is a guide rail 23, 24 serving together to guide the vertical carriage 9. Preferably at least one of the two guide rails 23, 24 is configured as a rack so that a pinion (not shown) powered by an electric motor on the vertical carriage 9 has positive engagement to travel the vertical carriage 9 up and down. The vertical carriage 9 is preferably likewise supported by means of a linear guide on the main support 2. For this purpose, the two guide rails or racks 23, 24 are provided with a dovetail guide. As an alternative to a pinion drive, a spindle drive, particularly a ball screw may be provided for the vertical carriage 9. Both drive variants permit in any case repetitively precise positioning vertically.

The rotary plate 3, main carriage 5, vertical carriage 9, horizontal extension arm 12 as well as the articulated arm 14 are powered by electric motor about or along the corresponding axis, the electric motor drive belonging thereto not being shown. The manipulator gripper 18 is likewise powered by means of an electric motor to rotate about the axis of rotation 17 of the jointing link 16. Each of the drives is designed to cooperate with the corresponding gearing such that within the full freedom of movement provided repetitively precise positioning is made possible.

Figure 2:
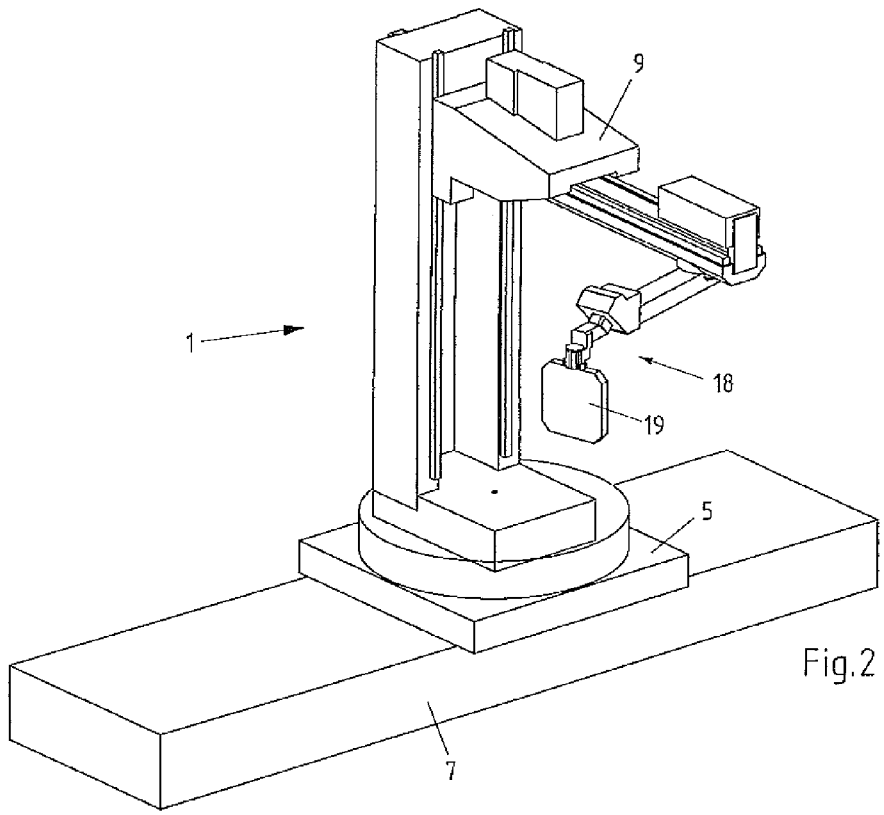
FIG. 2 is an illustration of a handling manipulator assembly as shown in FIG. 1 in a further view.

Referring now to FIG. 2 there is illustrated the handling manipulator assembly 1 as shown in FIG. 1 but with the main carriage 5 now travelled slightly to the left, whilst the vertical carriage 9 is travelled somewhat downwards and the horizontal extension arm 12 shifted slightly to the rear. In addition to this, the manipulator gripper 18 together with the workpiece pallet 19 has been turned through 180° by means of the jointing link 16.

Figure 3:
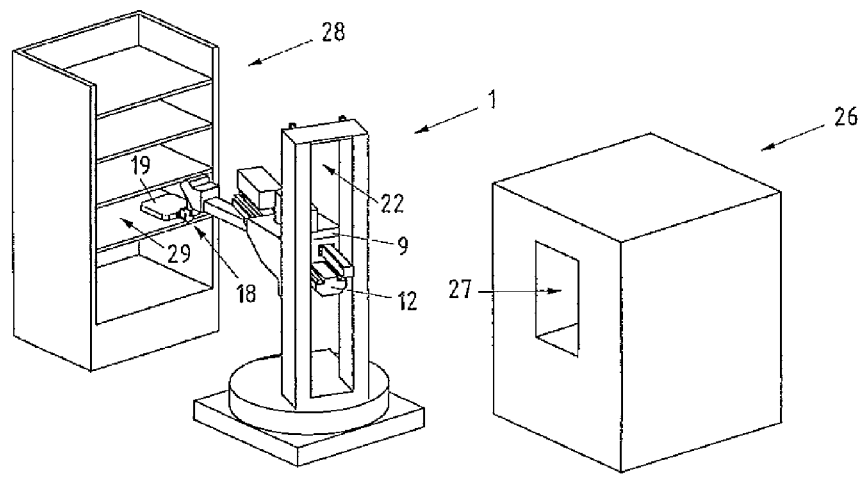
FIGS. 3 to 8 each illustrate the handling manipulator assembly in various phases of feeding a workpiece pallet to a machine tool.
Figure 4:
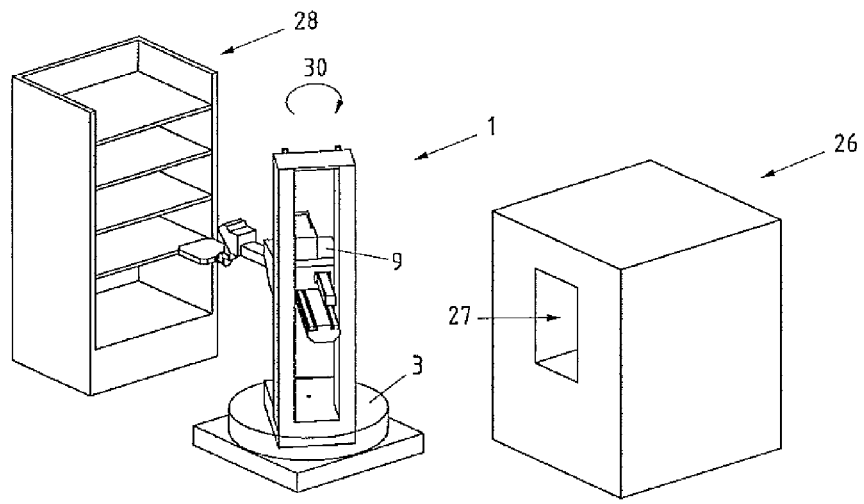
Figure 5:
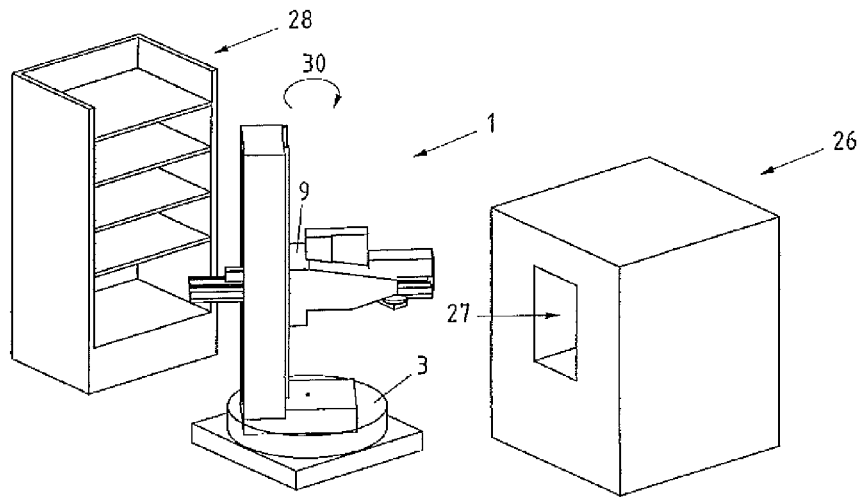

The basic function of the handling manipulator assembly 1 will now be explained by way of an example with reference to FIGS. 3 to 8 showing in each case the handling manipulator assembly 1 together with a machine tool 26 and a crib 28 for mounting the workpieces and/or pallets and/or tools depicted diagrammatically. The handling manipulator assembly 1 is arranged sideways on the machine tool 26, the latter featuring a front portal 27 via which the machine tool 26 is basically accessible and via which also workpieces or tools can be fed and removed. It is by this side location of the handling manipulator assembly 1, which in the normal case, i.e. when the handling manipulator assembly 1 is in its idle position facing away from the machine tool 26, that unobstructed access to the machine tool 26 is made possible via its front portal 27. From the illustrations as shown in FIGS. 3 and 4 it is furthermore evident that the horizontal extension arm 12 can extend through the slot 22 in the main support 2.

Referring now to FIG. 3 there is illustrated how the manipulator gripper 18 picks a workpiece pallet 19 from a compartment 29 of the crib 28. For this purpose, the workpiece pallet 19 is first picked by the manipulator gripper 18, the vertical carriage 9 then raised somewhat and the horizontal extension arm 12 travelled to the rear. Then, as indicated by the arrow 30 in FIGS. 4 and 5, the rotary plate 3 is rotated clockwise, the vertical carriage 9 already being travelled to the wanted vertical position during rotation.

Figure 6:
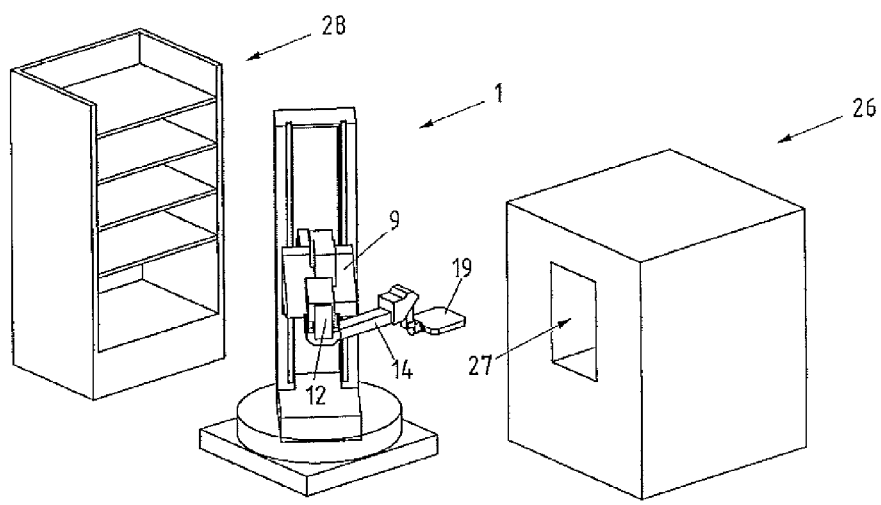

Referring now to FIG. 6 there is illustrated the handling manipulator assembly 1 just before the end of rotation. To feed the workpiece pallet 19 from this position of the machine tool 26 the horizontal extension arm 12 is travelled forwards and simultaneously the articulated arm 14 positioned so that the workpiece pallet 19 can be fed via the front portal 27 of the machine tool 26 as is evident from FIG. 7.

Figure 7:
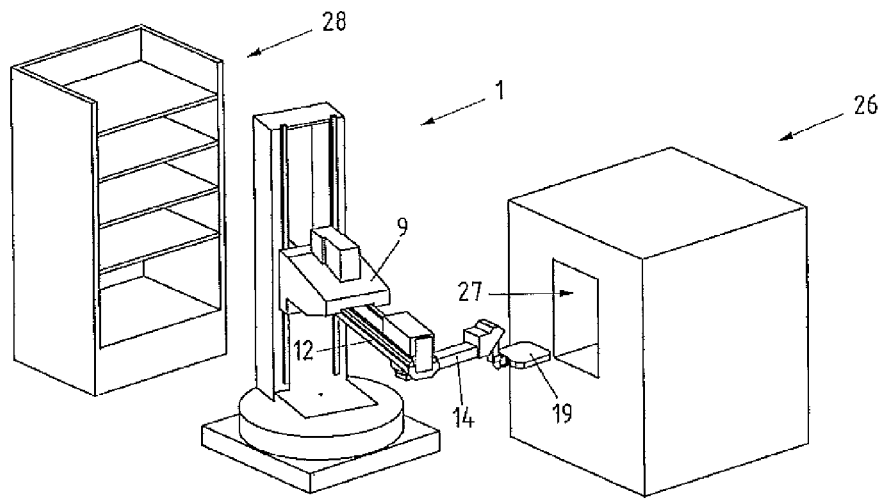
Figure 8:
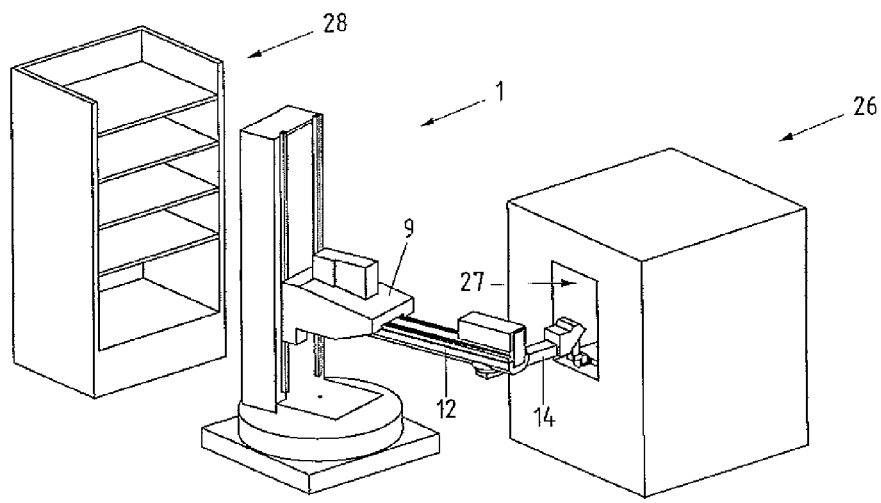

Referring now to FIGS. 7 and 8 it is evident how the workpiece pallet is fed to the machine tool 26 via the front portal 27, the actual feed motion being a combination of movements of parts of the handling manipulator assembly 1, involving namely rotary motion of the rotary plate 3 together with vertically travel of the vertical carriage 9, a horizontal shift in position of the horizontal extension arm 12 together with simultaneous rotational positioning of the articulated arm 14. From the FIGS. 7 and 8 it is also evident that the articulated arm 14 must feature a certain minimum length so that the gripper can be advanced corresponding deeply into the front portal 27 in a side arrangement of the handling manipulator assembly 1. In this case good results have been attained when the length of the articulated arm 14 corresponds preferably to at least 0.4 times the length of the horizontal extension arm 12.

When the main support 2 is located on a main carriage 5 for horizontal travel (FIG. 1) an overlying motion of the main carriage 5 may be further involved. Providing a main carriage 5 is particularly useful when the handling manipulator assembly 1 is required to serve a plurality of machine tools and/or pick and place workpieces or tools from a plurality of cribs.

Depending on the arrangement and application of the handling manipulator assembly 1 it may be useful to configure the rotary plate 3 such that it can be rotated about the vertical axis 4 by more than 360°.

The handling manipulator assembly 1 as shown is configured comparatively simple and is cost-effective in production, it being only the motor serving to power the vertical carriage 9 which needs to have a relatively high performance so that also heavy loads can be lifted. By contrast, the motors provided to move the main carriage 5 as well as the horizontal extension arm 12 and articulated arm 14 can be dimensioned correspondingly small since these need to lift no heavy loads, they needing simply to overcome in addition to the accelerating mass substantially only friction forces. In any case the handling manipulator assembly 1 as shown is also suitable for handling tools or workpieces weighing as much as 100 kilograms and more. On top of this, the handling manipulator assembly 1 finds universal application and the manipulator gripper 18 can be positioned precisely repetitively within its action range.

Figure 9:
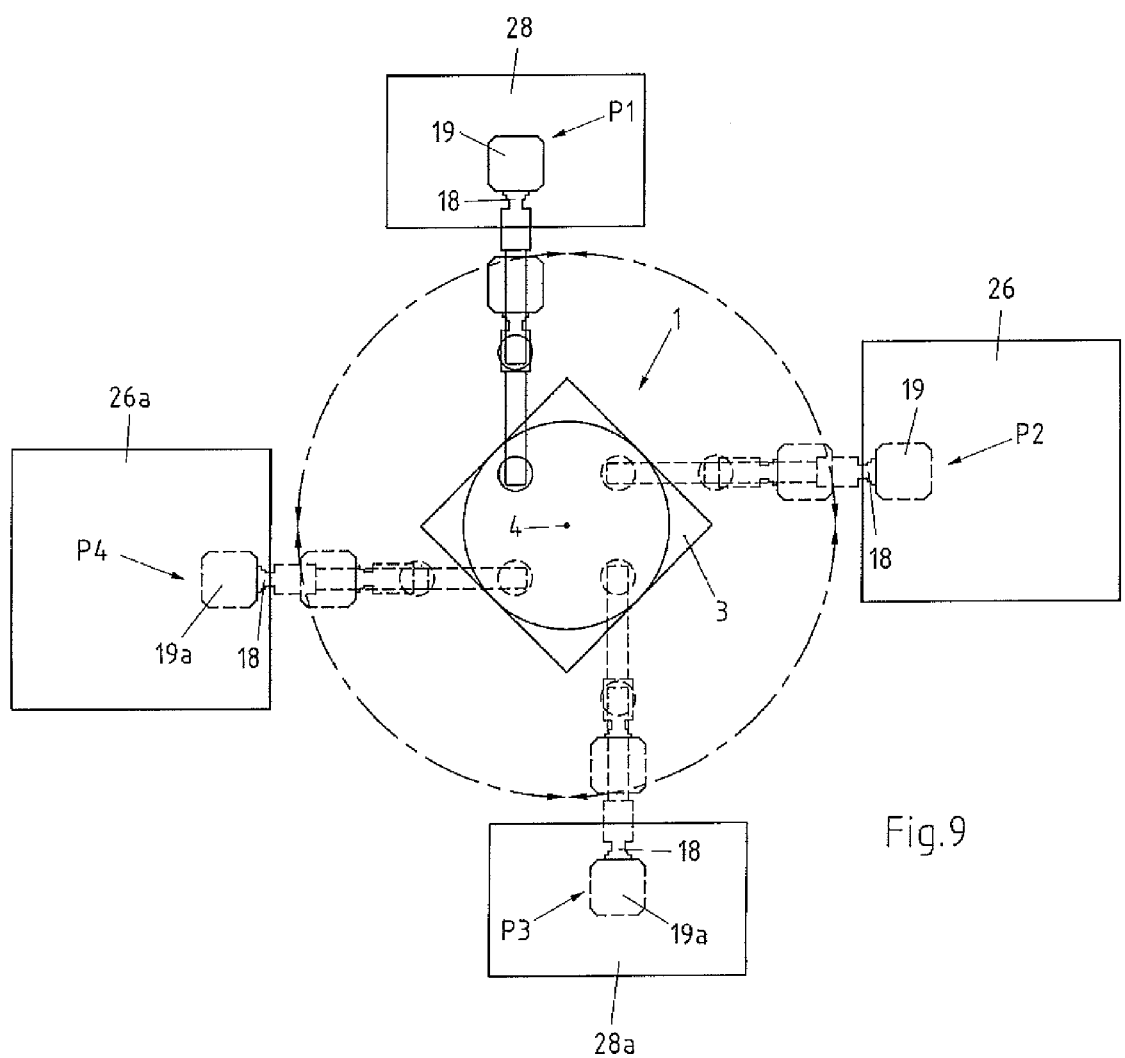
FIG. 9 is a top-down diagrammatic illustration of the machine tool assembly comprising a handling manipulator assembly, two machine tools and two cribs.

Referring now to FIG. 9 there is illustrated in conclusion a top-down diagrammatic view of a machine tool assembly comprising a handling manipulator assembly 1, two machine tools 26, 26a as well as two cribs 28, 28a. The two machine tools 26, 26a as well as the cribs 28, 28a are arranged on a ring encircling the handling manipulator assembly 1. This is why in this case there is no need to arrange the handling manipulator assembly 1 on a horizontal travelling main carriage, it instead being sufficient to arrange the handling manipulator assembly 1 on a rotary plate 3 for rotating about a vertical axis 4. In this case the handling manipulator assembly 1 is rotatable through more than 360° about the vertical axis 4 as a result of which the handling speed can be substantially increased for certain applications as explained by way of the following example.

If, for example, the machine tool 26 is to be fed a workpiece 19 from the crib 28, the handling manipulator assembly 1 must first position its manipulator gripper 18 to the position P1. This must be followed by a rotary motion through 90° clockwise so that the manipulator gripper 18 can assume the position P2 in which the workpiece 19 can be fed to the machine tool 26. The next requirement is that the machine tool 26a needs to be fed a workpiece 19a from the crib 28a. For this purpose, the handling manipulator assembly 1 first needs to perform a rotary motion through 90° clockwise so that the manipulator gripper 18 assumes the position P3. From the position P3 the handling manipulator assembly 1 then again needs to perform a rotary motion through 90° clockwise so that the workpiece 19a can be fed to the machine tool 26a. Where the handling manipulator assembly 1 can be rotated through more than 360° about the vertical axis 4, it can then by a further rotary motion through 90° clockwise pick a workpiece from the crib 28 and feed it to the machine tool 26. In any case, pivoting in this case can be reduced from 270° to 90° resulting in a considerable increase in speed. It is understood that the actions as just described are merely exemplary in character. But, in any case the handling manipulator assembly 1 can pick workpieces or also tools from the two cribs 28, 28a and feed them to the two machine tools 26, 26a by a pivoting motion of the handling manipulator assembly 1 not needing to exceed 180°.

The handling manipulator assembly described herein finds universal application and is suitable to particular advantage to feed and remove workpieces and tools to/from a machine tool. A handling manipulator assembly having such a configuration can be arranged sideways on the machine tool so that there is no appreciable obstruction to accessing the machine tool.

On top of this, the handling manipulator assembly features good freedom of movement and a large action radius of the gripper. Because of the comparatively few components in conjunction with the few linear and rotary axes it is, in addition, configured relatively simply and rugged so that even heavy loads can be handled. In addition to all this, combining the movements of several elements of the handling manipulator assembly optimizes the dynamics whilst reducing access time.

The invention claimed is:

1. A handling manipulator assembly comprising:
    a vertically extending main support (2) rotatable about a vertical axis (4);
    a horizontal extension arm (12) supported by a vertically travelling vertical carriage (9) on said vertical main support (2); and
    a manipulator gripper (18) supported on said horizontal extension arm (12),
    characterized in that said horizontal extension arm (12) is supported on the underside of said vertical carriage (9) for horizontal travel by means of a linear guide, wherein said extension arm has a length greater than the length of the linear guide; and
    said horizontal extension arm (12) is provided with an articulated arm (14) rotatable relative to said horizontal extension arm about a vertical axis (15), said manipulator gripper (18) being arranged at the end of said articulated arm (14),
    wherein said extension arm is supported for horizontal travel beyond each of the opposite ends of the linear guide with said articulated arm rotated to a position transverse to the direction of horizontal travel.

2. The handling manipulator assembly as set forth in claim 1, characterized in that said main support (2) is secured to a horizontally travelling main carriage (5).

3. The handling manipulator assembly as set forth in claim 1, characterized in that said main support (2) is rotatable about the vertical axis (4) by more than 360°.

4. The handling manipulator assembly as set forth in claim 1, characterized in that the ratio of the length of said articulated arm (14) to the length of said horizontal extension arm (12) is between 0.4:1 and 1:1.

5. A handling manipulator assembly, comprising:
    a vertically extending main support (2) rotatable about a vertical axis (4);
    a horizontal extension arm (12) supported by a vertically travelling vertical carriage (9) on said vertical main support (2); and
    a manipulator gripper (18) supported on said horizontal extension arm (12),
    characterized in that said horizontal extension arm (12) is supported on the underside of said vertical carriage (9) for horizontal travel by means of a linear guide; and
    said horizontal extension arm (12) is provided with an articulated arm (14) rotatable about a vertical axis (15), said manipulator gripper (18) being supported at an end of said articulated arm (14) by means of a jointing link (16), said jointing link (16) defining an axis of rotation (17) at an angle between 30° and 60° to the vertical.

6. The handling manipulator assembly as set forth in claim 1, characterized in that said main support (2), said horizontal extension arm (12) and said articulated arm (14) are movable by electric motor about or along the corresponding axis.

7. The handling manipulator assembly as set forth in claim 1, characterized in that said main support (2) is provided with a slot (22) extending vertically into which said horizontal extension arm (12) can extend.

8. The handling manipulator assembly as set forth in claim 7, characterized in that said vertical carriage (9) is supported on both sides of said slot (22) for travelling along said the main support (2).

9. The handling manipulator assembly as set forth in claim 8, characterized in that a rack (23, 24) is arranged on both sides of said slot (22), each said rack (23, 24) extending vertically and serving to guide said vertical carriage (9) and to non-positively support said carriage (9) on the main support (2).

10. The handling manipulator assembly as set forth in claim 9, characterized in that said vertical carriage (9) is provided with pinions for positively engaging each said rack (23, 24), said pinions being powered by electric motor to vertically drive said vertical carriage (9).

11. The handling manipulator assembly as set forth in claim 1, characterized in that said main support (2) is arranged on a rotary plate (3) rotatable about said vertical axis (4).

12. The handling manipulator assembly as set forth in claim 11, characterized in that said main support (2) is centered on said rotary plate (3).

13. The handling manipulator assembly as set forth in claim 11, characterized in that said main support (2) is arranged off-centered on said rotary plate (3).

14. The handling manipulator assembly as set forth in claim 1, characterized in that said manipulator gripper (18) is configured to grip workpieces and/or workpiece pallets and/or tools.

15. A method comprising using a handling manipulator assembly (1) as defined in claim 1 for feeding/removing workpieces and/or tools to/from a machine tool 26.

16. A machine tool assembly including a machine tool (26) comprising a front portal (27) for feeding and removing tools and/or workpieces and a handling manipulator assembly (1) configured as set forth in claim 1, characterized in that said handling manipulator assembly (1) is arranged sideways from said front portal (27) of said machine tool (26).

17. The machine tool assembly as set forth in claim 16, characterized in that arranged in the motion range of the handling manipulator assembly (1) is a crib (28) for holding tools and/or workpieces and/or workpiece pallets.

18. A machine tool assembly including at least two machine tools each comprising a front portal (27) for feeding and removing tools and/or workpieces and a handling manipulator assembly (1) configured as set forth in claim 3, characterized in that said handling manipulator assembly (1) is arranged for vertical travel along said machine tools and rotatable about said vertical axis (4) by more than 360°.

19. The machine tool assembly of claim 1, wherein said articulated arm is supported on the underside of said horizontal extension arm for rotation about said vertical axis.

\* \* \* \* \*